(12) United States Patent
Cates et al.

(10) Patent No.: US 6,722,672 B2
(45) Date of Patent: *Apr. 20, 2004

(54) HANDCART WITH DETACHABLE BIN

(76) Inventors: James L. Cates, 503 Dailey's Creek Dr., McDonough, GA (US) 30253; Michael H. Standridge, 1690 Highway 155, S. McDonough, GA (US) 30253

(*) Notice: Subject to any disclaimer, the term of this patent is extended or adjusted under 35 U.S.C. 154(b) by 0 days.

This patent is subject to a terminal disclaimer.

(21) Appl. No.: 10/118,036

(22) Filed: Apr. 8, 2002

(65) Prior Publication Data

US 2002/0195782 A1 Dec. 26, 2002

Related U.S. Application Data

(63) Continuation-in-part of application No. 09/361,732, filed on Jul. 27, 1999, now Pat. No. 6,390,495.

(51) Int. Cl.⁷ .................................................. B62B 1/00
(52) U.S. Cl. .................................... 280/47.26; 280/652
(58) Field of Search ................ 280/33.991, 33.992, 280/33.998, 33.995, 651, 652, 47.131, 47.17, 47.18, 47.24, 47.26, 47.31, 79.2, 79.7, 47.19, 47.35, 79.5; 206/216, 546, 335; 15/257.4; 111/7.1, 7.2

(56) References Cited

U.S. PATENT DOCUMENTS

| | | | |
|---|---|---|---|
| 102,376 A | 4/1870 | Dedrick | |
| 434,814 A | * 8/1890 | Tuck | ............................ 111/7.1 |
| 616,443 A | 12/1898 | Anderson | |
| D175,069 S | 7/1955 | Gandola | |
| 2,992,011 A | 7/1961 | Becan | |
| 3,106,303 A | 10/1963 | Finocchiaro | |
| 3,170,183 A | 2/1965 | Leatherman | |
| 3,262,713 A | 7/1966 | Crawford | |
| 3,346,271 A | 10/1967 | Parsons | |
| 3,418,005 A | 12/1968 | Allina | |
| 3,460,850 A | 8/1969 | Franklin | |
| 3,751,058 A | 8/1973 | Larsen | |
| 3,827,708 A | * 8/1974 | Derry | ......................... 280/651 |
| 3,851,938 A | * 12/1974 | McCowan, et al. | ......... 312/117 |
| 3,875,981 A | 4/1975 | Brenner et al. | |
| 3,884,491 A | 5/1975 | Hughart | |
| 3,934,803 A | 1/1976 | Paulus, Jr. | |
| 3,950,004 A | 4/1976 | Olsson | |
| 4,090,310 A | * 5/1978 | Koff | ............................. 34/58 |
| 4,222,580 A | 9/1980 | Krokonko | |

(List continued on next page.)

FOREIGN PATENT DOCUMENTS

| | | |
|---|---|---|
| FR | 2596005 | 12/1986 |
| WO | WO 90/10566 | 9/1990 |

Primary Examiner—Bryan Fischmann
(74) Attorney, Agent, or Firm—Myers & Kaplan; Barry E. Kaplan

(57) ABSTRACT

Disclosed is a wheeled handcart having a removable debris bin, a partition, a ramp for sweeping, raking or otherwise sliding debris into the cart or its bin, and pivotable handles, wherein the cart may be utilized with or without the debris bin, and wherein the cart may be utilized in a vertical or horizontal position. To assist in preventing the debris or other content of the cart from spilling out, a partition is provided that slidably engages within tracks formed on the interior of the cart. When the debris bin is not installed, the partition serves to keep debris and other contents within the cart. Handles are pivotably connected to the cart to allow not only a multitude of advantaged lifting angles, but also the lifting of the handles such that the handles will not interfere with the loading or unloading of the cart. Alternative embodiments provide an opening in the partition for providing access to the debris bin, and an opening, rearward of the cart, useful for the spreading of granular materials.

20 Claims, 5 Drawing Sheets

U.S. PATENT DOCUMENTS

| | | | |
|---|---|---|---|
| 4,248,442 A | 2/1981 | Barrett | |
| 4,261,596 A | 4/1981 | Douglas | |
| 4,274,645 A * | 6/1981 | Ferguson et al. | 280/47.26 |
| D261,125 S | 10/1981 | Gordon et al. | |
| 4,302,894 A | 12/1981 | Emma | |
| 4,341,393 A | 7/1982 | Gordon et al. | |
| 4,350,356 A | 9/1982 | Crothers | |
| 4,357,728 A | 11/1982 | Pravettone | |
| 4,442,567 A | 4/1984 | Pravettone | |
| 4,471,996 A | 9/1984 | Primeau | |
| 4,570,961 A | 2/1986 | Chateauneuf et al. | |
| 4,600,113 A | 7/1986 | DeMars | |
| 4,601,315 A | 7/1986 | France | |
| 4,629,203 A | 12/1986 | Ballard | |
| 4,697,834 A | 10/1987 | Scott | |
| 4,697,835 A | 10/1987 | Scott | |
| 4,778,191 A | 10/1988 | Heisson | |
| 4,802,258 A | 2/1989 | Jensen | |
| 4,889,397 A * | 12/1989 | Ryan | 312/332.1 |
| 4,953,744 A | 9/1990 | Koyama | |
| 5,031,277 A | 7/1991 | Coker | |
| 5,040,754 A | 8/1991 | Dearman | |
| 5,083,731 A | 1/1992 | Fullilove | |
| 5,123,187 A | 6/1992 | Zamaria | |
| 5,180,125 A | 1/1993 | Caveney | |
| 5,323,990 A | 6/1994 | Graves | |
| 5,423,195 A | 6/1995 | Peters | |
| 5,445,397 A | 8/1995 | Evans | |
| 5,503,090 A * | 4/1996 | Guzan | 111/7.2 |
| 5,593,117 A | 1/1997 | Alexander, III | |
| D384,461 S | 9/1997 | Kouvdos | |
| 5,671,933 A | 9/1997 | Tucker | |
| 5,704,625 A | 1/1998 | Presnell et al. | |
| 5,730,451 A | 3/1998 | Walker | |
| 5,802,807 A | 9/1998 | Johnson | |
| 5,893,572 A | 4/1999 | Parks | |
| 5,906,381 A | 5/1999 | Hovatter | |
| 6,494,468 B1 * | 12/2002 | Inge | 280/47.35 |
| 6,550,792 B1 * | 4/2003 | Salmon et al. | 280/47.24 |
| 6,585,304 B1 * | 7/2003 | Boozer et al. | 294/55 |
| 2001/0045718 A1 * | 11/2001 | Boirum | |

* cited by examiner

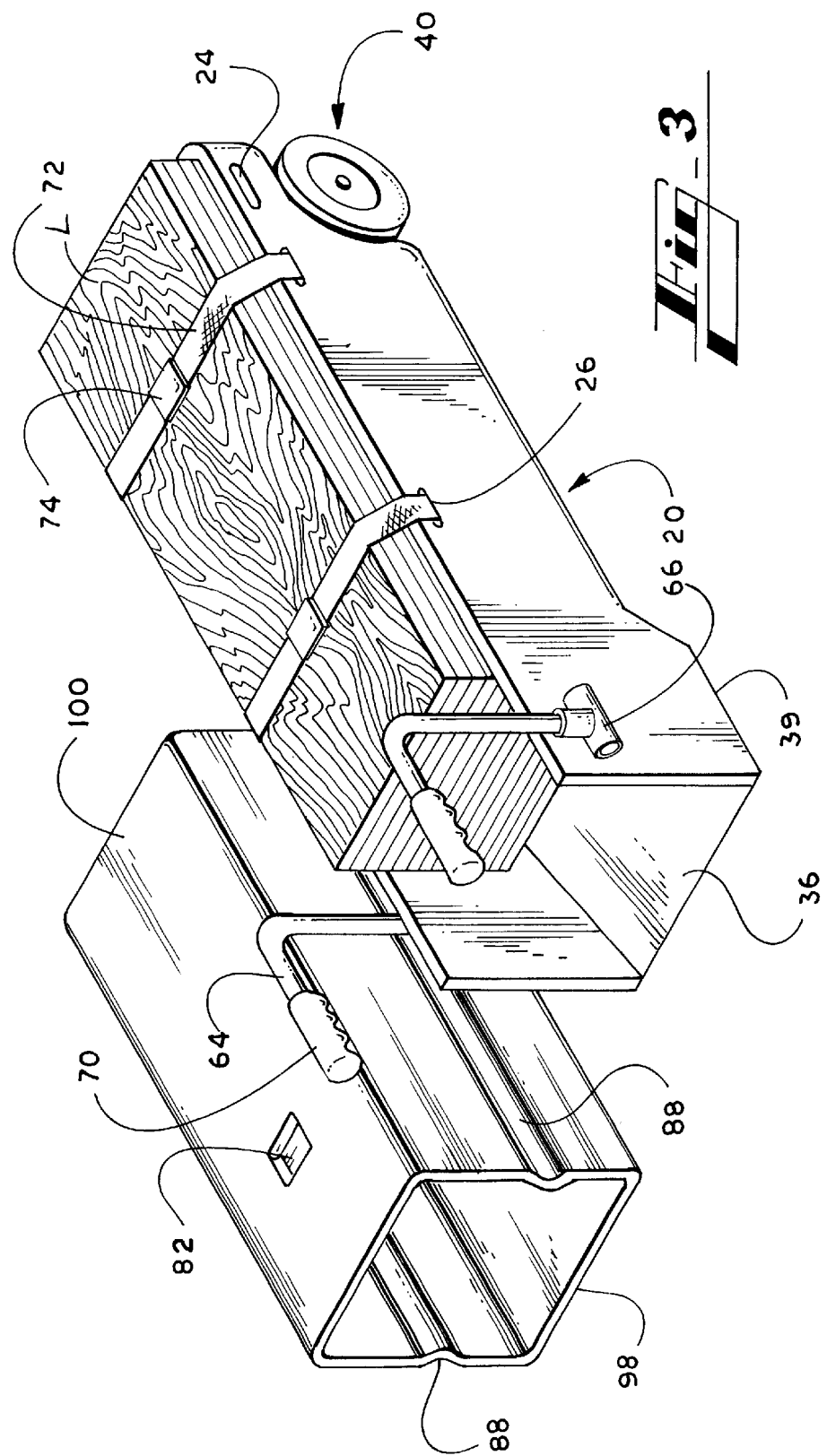

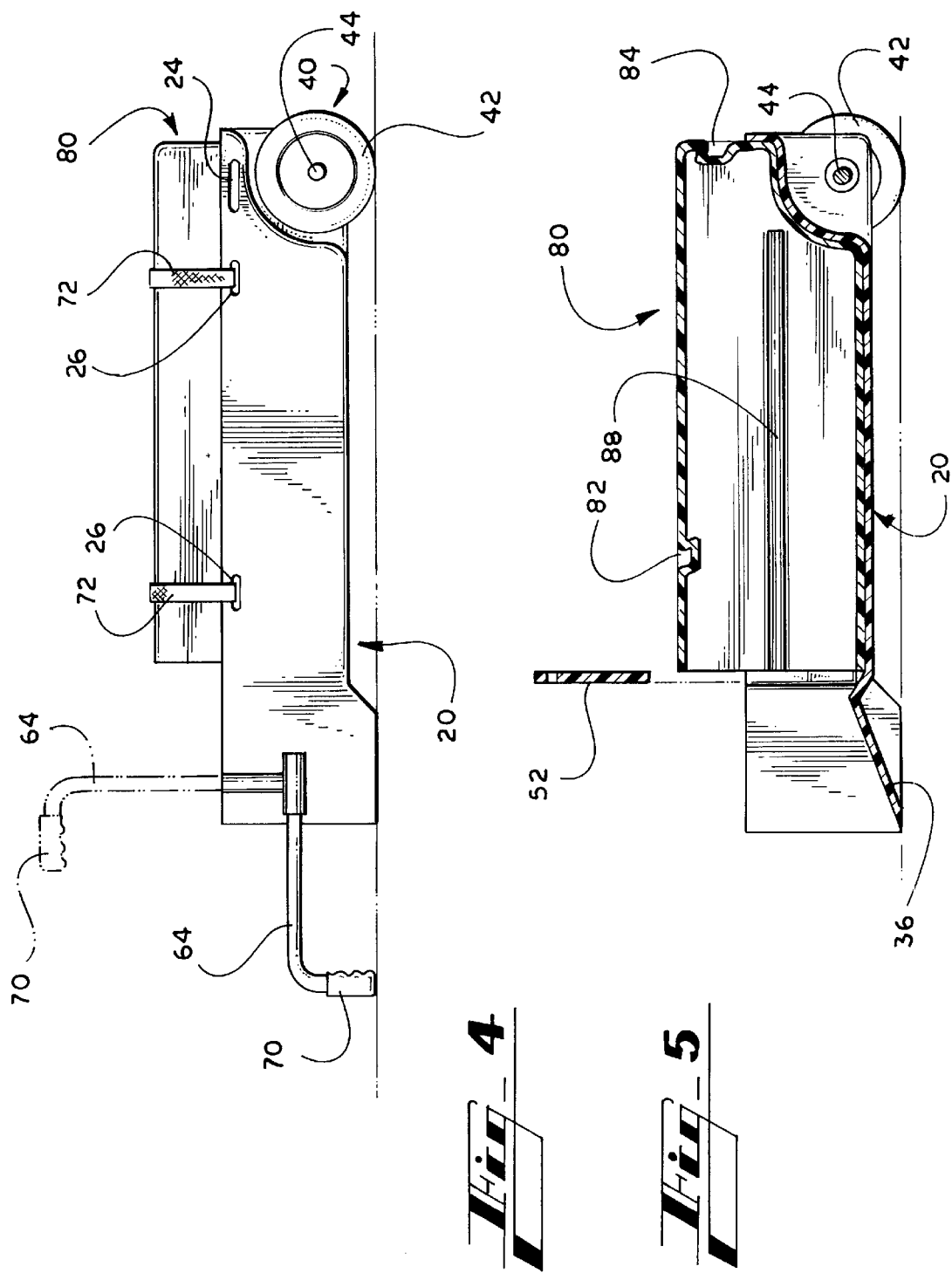

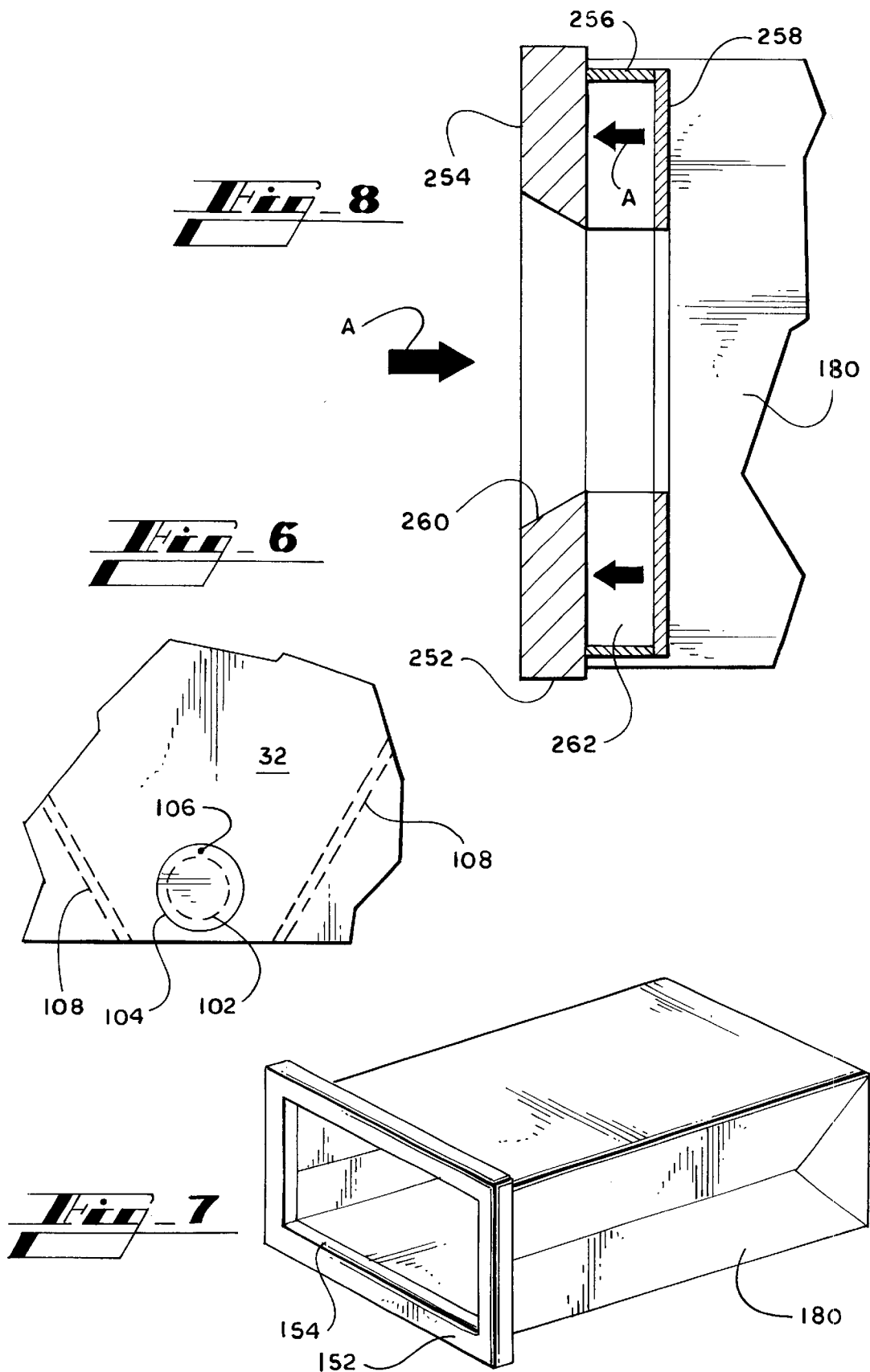

HANDCART WITH DETACHABLE BIN

RELATED APPLICATIONS

This non-provisional patent application is a continuation-in-part of application Ser. No. 09/361,732 filed on Jul. 27, 1999, now issued as U.S. Pat. No. 6,390,495.

TECHNICAL FIELD

The present invention relates generally to carts and, more specifically, to transportable handcarts having removable storage and debris transportation containers.

BACKGROUND ART

There is a widespread need to facilitate the manual transportation of yard, house, and industrial debris and other materials. As a result, a variety of handcarts have been proposed. With many traditional handcarts, however, the bin or storage space is an integral, undetachable portion of the device; and, thus, the functionality of the device has been restricted. Additionally, with many traditional handcarts, the carts were unable to be effectively placed in a horizontal position to facilitate the insertion and removal of debris and other materials. Moreover, of those cart designs that can be placed in a horizontal position, many do not provide a ramp means for the user's ease in sweeping, raking, or otherwise sliding the debris or other materials into the cart. Such functionality is desirable so that the user need not lift such debris or other materials into the cart.

In an attempt to overcome some of these noted deficiencies, a number of carts having ramps have been patented. Examples of such devices may be seen with reference to U.S. Pat. No. 2,992,011 to Becan; U.S. Pat. No. 3,106,303 to Finocchiaro; U.S. Pat. No. 3,875,981 to Brenner et al.; U.S. Pat. No. 4,261,596 to Douglas; U.S. Pat. No. 4,357,728 to Pravettone; U.S. Pat. No. 4,442,567 to Pravettone; and, U.S. Pat. No. 5,031,277 to Coker.

None of the above handcart devices, however, disclose or teach the novel features of the present invention as disclosed herein. Accordingly, it is readily apparent that a new and improved handcart is needed that has a removable debris bin, a partition for securing the contents within the cart and/or debris bin, multi-position or pivotable handles for facilitating the cart's maneuverability and function, and that has the capability of being utilized with or without the debris bin. It is further apparent that that a new and improved handcart is needed that has an opening in the partition for providing access to the debris bin, and that has an opening, rearward of the cart, useful for the spreading of granular materials. It is, therefore, to the provision of such an improvement that the present invention is directed.

BRIEF SUMMARY OF THE INVENTION

Briefly described, in a preferred embodiment, the present invention overcomes the above-mentioned disadvantages by providing a handcart having a removable debris bin and pivotable handles wherein the cart may be utilized with or without the debris bin, and wherein the cart may be utilized in a vertical or horizontal position.

More specifically, the present invention comprises a cart, a debris bin, a partition, and a ramp. The cart is generally elongated and defined by a first side wall, a second side wall, an end wall, and a bottom wall. Formed at the end distal from the end wall is a ramp portion that serves as a debris sweeping ramp, when the cart is placed in a horizontal position, to allow the sweeping, raking or otherwise sliding of debris or other objects into the cart; thus, eliminating the need to lift the debris from the ground or flooring. The debris bin is generally rectangular-box shaped with an open end. To provide a means for removably securing the debris bin within the cart, recessed areas are formed on the exterior side walls of the debris bin which engage with protrusions formed on the interior of the cart.

To assist in preventing the debris or other contents of the cart from spilling out, a partition is provided that slidably engages within tracks formed on the interior of the cart. These tracks are formed at a position that is proximate to the opening of debris bin, when it is installed within the cart, to serve as a partial lid or cover. When the debris bin is not installed, the partition serves to keep debris and other contents within the cart.

In order to provide access to the debris bin, the partition may be provided with a central opening. Suitably configured, the partition opening may accommodate a soft-sided bin, such as a lawn and garden bag. Suitably configured, the partition further may accommodate a hose, the hose being useful for connection to a lawn and garden vacuum or blower, in order to provide for high speed filling of the bin.

The handles are pivotably connected to the cart to allow not only a multitude of advantaged lifting angles, but also to allow the lifting of the handles such that the handles will not interfere with the loading or unloading of the cart. Two wheels joined by an axle are attached to the bottom of the cart near the end wall to provide a means for easily rolling and maneuvering the cart and its contents. In addition, a plurality of hand holes or recessed areas, dimensioned for receiving a hand, are formed on the cart and the debris bin to facilitate the lifting, lowering, and maneuvering of the present device.

The cart may be provided further with an opening disposed in the rearward wall of the cart, the opening being selectively closeable through a plurality of positions, and being useful for the spreading of granular materials, such as lawn and garden fertilizers, grass seed, or the like, or feedstocks for animals. Channeling means may be provided within the cart to assist in directing such granular materials to the rearward opening.

Thus, an object, feature, and advantage of the present invention is to provide a new and improved handcart having a removable debris bin.

Another object, feature, and advantage of the present invention is to provide a new and improved handcart that can be utilized with or without the removable debris bin.

Another object, feature, and advantage of the present invention is to provide a new and improved handcart that can be utilized in a vertical or horizontal position.

Another object, feature, and advantage of the present invention is to provide a new and improved handcart having handles that are rotatable such that the handles may be placed in a plurality of positions.

Another object, feature, and advantage of the present invention is to provide a new and improved handcart having a partition for keeping the contents within the cart or debris bin.

Another object, feature, and advantage of the present invention is to provide a new and improved handcart wherein the partition provides an opening for providing access to the removable bin.

Another object, feature, and advantage of the present invention is to provide a new and improved handcart having an angled bottom wall portion which serves as a ramp when the cart is placed in a horizontal position for facilitating the sweeping, raking, or otherwise sliding of debris or other objects into the cart or debris bin.

Another object, feature, and advantage of the present invention is to provide a new and improved handcart having a plurality of wheels to provide a means for moving the cart and its contents.

Another object, feature, and advantage of the present invention is to provide a new and improved handcart having an opening disposed in the rearward wall of the cart, the opening being selectively closeable through a plurality of positions, and being useful for the spreading of granular materials.

These and other objects, features and advantages of the invention will become more apparent to one skilled in the art from the following description and claims when read in light of the accompanying Figures.

BRIEF DESCRIPTION OF THE FIGURES

The present invention best will be understood through consideration of, and reference to, the following Figures, viewed in conjunction with the Detailed Description of the Preferred Embodiment referring thereto, in which like reference numbers throughout the various Figures designate like structure and in which:

FIG. 3 is a perspective view of the device according to an alternate embodiment of the present invention wherein the debris bin is removed and materials are strapped within the cart of the device according to a preferred embodiment of the present invention;

FIG. 4 is a side view of the device according to a preferred embodiment of the present invention;

FIG. 5 is a cutaway side view of the device according to a preferred embodiment of the present invention;

FIG. 6 is a partial side view of the rearward wall of the cart of the present invention;

FIG. 7 is a perspective view of an alternative embodiment of the partition of the present invention; and, FIG. 8 is a sectional side view of another alternative embodiment of the partition of the present invention.

Figure 1:
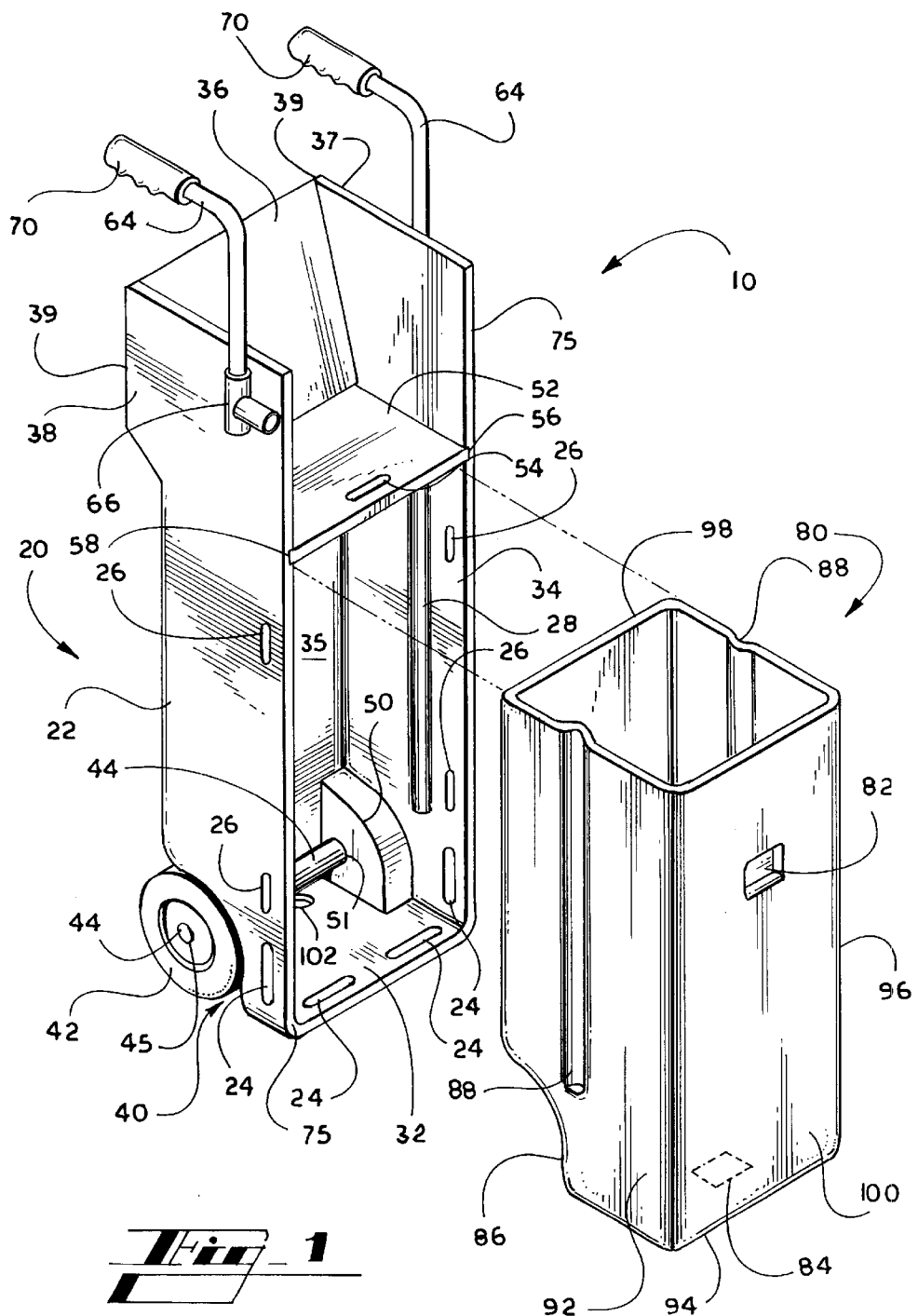
FIG. 1 is a perspective partially exploded view of the device according to a preferred embodiment of the present invention.
Figure 2:
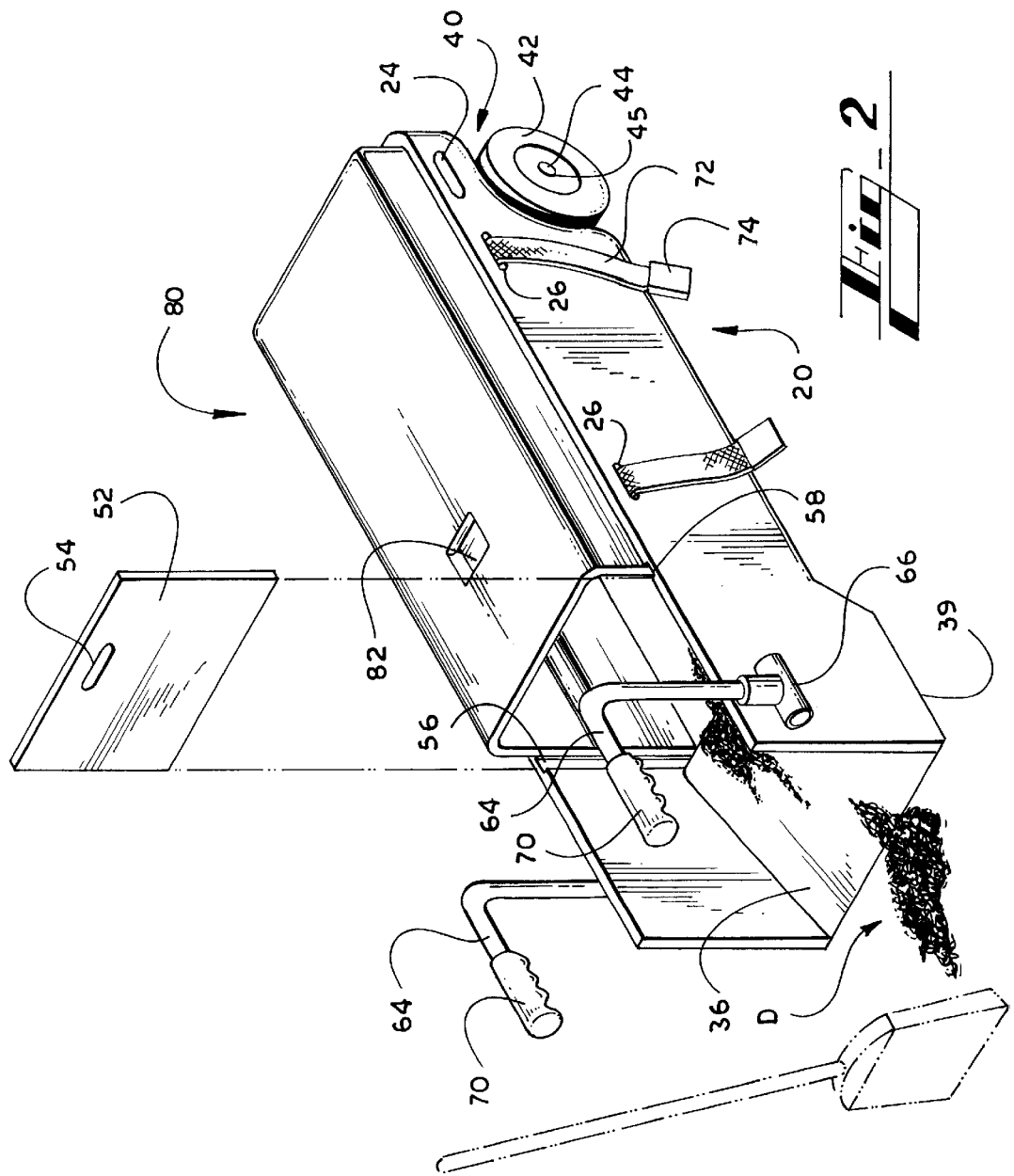
FIG. 2 is a perspective partially exploded view of the device according to a preferred embodiment of the present invention.

As the reader doubtless will realize, the invention is susceptible of other and different embodiments, and its several details are capable of modifications in various respects, all without departing from the scope and spirit of the present invention. Accordingly, the Figures and the descriptions referring thereto are to be regarded as only illustrative in nature, and not as restrictive.

DETAILED DESCRIPTION OF THE PREFERRED EMBODIMENT

In describing the various embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Referring now to FIGS. 1–5, device 10 generally comprises cart 20 and debris bin 80. More specifically, cart 20 is generally a rectangular-shaped open apparatus defined by first side wall 22, end wall 32, second side wall 34, and bottom wall 35. To facilitate the loading and/or unloading of debris D into and from cart 20, a portion of the proximal end of bottom wall 35 is angled downward; thus, forming a ramp 36 wherein the proximal end of ramp 36 mates with the ground or flooring when device 10 is placed in the horizontal position, and the distal end of ramp 36 mates approximately with debris bin 80, when installed. Preferably, first side wall 22 and second side wall 34 extend downward at the proximal end to engage ramp 36, thus forming extension portions 37, 38. When device 10 is placed in the horizontal position, bottom surfaces 39 of extension portions 37, 38 and the proximal end of ramp 36 rest upon the ground or flooring.

To provide means for rolling cart 20, wheel assembly 40 is attached preferably at the distal end of cart 20 proximate to bottom wall 35. Wheel assembly 40 generally comprises two wheels 42 rotatably connected via axle 44. To accommodate wheel assembly 40 on cart 20, raised areas 50 are preferably formed on the distal ends of first side wall 22, second side wall 34, and bottom wall 35 proximate to end wall 32. Raised areas 50 are dimensioned for receiving wheels 42. Axle 44 extends through throughholes 51 formed through raised areas 50 on first side wall 22 and second side wall 34, and is attached to wheels 42 at each end through throughholes 45 formed through wheels 42. Throughholes 51 of raised areas 50 are formed preferably at a position such that end wall 32 aligns with the outer circumference of wheels 42 and such that wheels 42 extend slightly beyond bottom wall 35. It should be noted that larger or smaller wheels may be utilized to mechanically advantage the movement of cart 20, and as such, the size and location of throughholes 51 and the size of raised areas 50 may be modified accordingly. Wheels 42 may be attached to axle 44 via eye pins, lug nuts, or other well known attaching means. Preferably, the length of axle 44 is approximately the width of cart 20 such that the outer edges of wheels 42 approximately align with first side wall 22 and second side wall 34, respectively. It will be recognized that a tube, or other equivalent structure, may traverse between throughholes 51 for housing axle 44 and sheltering it from frictional contact with a load L (FIG. 3) and from the deleterious effects of any debris contained within cart 20.

Extending approximately from the distal end of ramp 36 to raised areas 50 on the interior of first side wall 22 and second side wall 34 are protrusions 28 dimensioned for mating and snap-fitting with recessed areas 88 of debris bin 80 as further described below.

Pivotably attached to the exterior of first side wall 22 and second side wall 34 near the proximal end of cart 20 are preferably two handle supports 66 for receiving and securing the distal end of handles 64. Handles 64 are generally L-shaped members and are secured to handle supports 66 by any well-known means such as welding, bolting, or eyepinning. At the proximal end of handles 64 are handle grips 70 dimensioned for snugly receiving the proximal ends of handles 64.

To facilitate the movement and lifting of cart 20, a plurality of handle 64 positions are allowed by way of pivotably attached handle supports 66. More specifically, handle supports 66 are attached such that handle supports 66 pivot from a generally parallel position, relative to side walls 22, 34, to a generally perpendicular position, relative to side walls 22, 34. Through the use of well known means such as snap fittings, or protrusion and aperture mechanisms, handle supports 66 are locked into a plurality of positions.

The positioning of handle supports 66 and the length of handles 64 are such that when handle supports 66 are positioned in a parallel position relative to side walls 22, 34, the proximal ends of handles 64 and handle grips 70 do not extend past bottom surfaces 39 of extension portions 37, 38, so that when cart 20 is placed in the horizontal position, handles 64 and handle grips 70 do not interfere with bottom surfaces 39 resting upon the ground or flooring.

Advantageously, the position of handles 64 may be adjusted by the user and so oriented as to provide for the user's ease and comfort while using cart 20. For example, the user may adjust the handles 64 to such a convenient angle as will provide for his comfort and maximum leverage when using cart 20 as a conventional wheelbarrow; i.e., in a slightly off horizontal position; or, as a handtruck; i.e., in a slightly off-vertical position.

To further assist in lifting and maneuvering cart 20, preferably, hand slots 24, dimensioned for receiving the hand, are formed at the distal end of cart 20 on side walls 22, 34 proximate to raised areas 50, end wall 32, and surface 75. It should be noted that additional hand slots 24 may be positioned along cart 20 to provide further assistance in maneuvering the device.

Provided are securing straps 72 having fastening means 74. In order to provide an attaching means for straps 72, preferably, strap slits 26 are formed on both sides of cart 20 in side walls 22, 34 near surface 75. Each strap slit 26 has an opposing strap slit 26 generally positioned directly across on the opposite side wall. In use, straps 72, extending through strap slits 26, are utilized to help secure a load L within cart 20 when device 10 is used without debris bin 80. Alternatively, although not necessary, when debris bin 80 is utilized, straps 72 can be used to provide additional securing means for securing debris bin 80 within cart 20.

Partition 52 is provided to assist in containing debris D or other contents within debris bin 80, when debris bin 80 is utilized, or within cart 20, when cart 20 is used without debris bin 80. Formed preferably along first side wall 22 and second side wall 34, generally perpendicular to bottom wall 35 and near the distal end of ramp 36 are preferably two tracks 56, 58, one on each side wall 22, 34. Tracks 56, 58 are dimensioned to slidably receive and engage partition 52. In the preferred embodiment, the length of partition 52 is approximately equal to the width of side walls 22 and 34. In use, after a user has filled cart 20, partition 52 may be slid onto cart 20, thereby securing the contents within cart 20. Alternatively, or as an additional component of device 10, the length of partition 52 is approximately equal to the width of debris bin 80 such that the opening of debris bin 80 is substantially covered when debris bin 80 is in cart 20. In use, after a user has filled debris bin 80, partition 52 may be slid onto cart 20 thereby securing the contents of debris bin 80.

To assist in inserting and removing partition 52 from tracks 56, 58, preferably, hand slot 54, dimensioned for receiving a hand, is formed generally in the center of partition 52 near the end distal from bottom wall 35.

Debris bin 80 is preferably and generally rectangular-box shaped with an open end and is, more particularly, defined by side walls 92, 96, end wall 94, bottom wall 98, and top wall 100. Formed on the exterior of side walls 92, 96 are recessed areas 88 dimensioned to mate with and to snapfit or slide within with protrusions 28 of cart 20; thereby, removably securing debris bin 80 within cart 20. Formed on the distal end of debris bin 80 on side walls 92, 96, end wall 94, and bottom wall 98 are recessed areas 86, dimensioned for receiving raised areas 50 of cart 20 such that bottom wall 98 of debris bin 80 rests approximately flush against bottom wall 35 of cart 20 when debris bin 80 is engaged within cart 20.

To assist in inserting and removing debris bin 80 to and from cart 20, preferably, two recessed hand grips 82, 84, dimensioned for receiving a hand, are formed to the exterior of debris bin 80. Hand grip 82 is positioned generally near the center of top wall 100, and hand grip 84 is positioned on end wall 94 generally near top wall 100. Known within the art, each hand grip 82, 84 has a lip or lips formed therein to provide the user a means for securely grabbing and griping debris bin 80.

Device 10 best may be manufactured of high impact plastic materials such as are well-known in the art, and formed in accordance with traditional plastic molding processes. It will be apparent to those ordinarily skilled in the art that cart 20 may be provided with an end wall 32 having an outward taper according to traditional wheelbarrow designs. Additionally, cart 20 may be provided with side walls 22, 34 having similarly outwardly tapering walls.

Best seen with reference to FIGS. 1 and 6, cart 20 may be further provided with opening 102 disposed within end wall 32. Opening 102 is disposed proximate bottom wall 35 and is advantageously positioned so as to be useful for the spreading of granular materials, such as lawn and garden fertilizers, seed, or the like, or feedstocks for animals, or liquids. Accordingly, opening 102 may be selectively opened and closed through a plurality of positions with the use of cover 104. Cover 104 may be attached through the use of hinge pin 106. Alternatively, cover 104 may be provided in a sliding gate and channel arrangement. Other arrangements will be recognized by those ordinarily skilled in the art.

In order to efficiently channel granular materials through opening 102, cart 20 further may be provided with channeling means, shown as walls 108. It will be appreciated that walls 108 may be formed integrally with cart 20, or may be provided in removable form, wherein walls 108 are shown in FIG. 6 in "phantom line" to suggest removability of same.

Debris bins of varying shapes and sizes may be provided to accommodate application of the device in a variety of fields of use. For example, but not by way of limitation, the debris bin 80 can be provided with top wall 100 having an arcuate shape; or, in combination with modified side walls 92, 96, and an arcuately shaped top wall 100, the bin can be provided with a mushroom-shaped cross-section.

Similarly, debris bin 80 may be provided with any of a variety of paper or plastic liners for catching and holding debris D, and for the user's ease in disposal. Alternatively, a paper-type debris bin may be provided, in combination with retaining clips, for the user's ease and convenience.

In order to accommodate such paper or plastic liners, partition 52 may be provided in alternative form. Best seen with reference to FIGS. 7 and 8, alternative partition 152 is provided with central partition opening 154. Partition opening 154 is disposed such that soft-sided bin 180, shown in the form of a conventional paper lawn and garden bag, may be affixed thereabout through the use of retaining clips or the like. Partition 152, accordingly, provides an opening allowing the user to directly access bin 180 for sweeping, raking, or placing debris directly into the bin, while retaining much of the functionality of the partition described hereinabove.

Suitably configured, and best seen with reference to FIG. 8, partition 252 further may be provided to accommodate a hose, the hose being useful for connection to a lawn and garden vacuum or blower, in order to provide for high speed filling of bin 80, 180. In such form, partition 252 is provided with filters or screens 254, 258, walls 256, and debris intake port 260. In such form, a vacuum or blower hose, suitably configured, may be attached to partition 252 at debris intake port 260. Debris-laden air is directed into bin 80, 180, wherein the debris is deposited. Air is recirculated to the environment by passing through filters or screens 258, 254 via air exhaust ports 262. It will be seen in FIG. 8 that arrows A designate the airflow path.

Furthermore, without departing from either the scope or spirit of the present invention, it will be apparent to those skilled in the art that the bin securing function of protrusions 28 and mating recessed areas 88 may be provided through alternative means, as with simple clips, pin and hole arrangements, spring detent-type pins and cooperating recesses, or the like. Similarly, protrusions 28 and mating recessed areas 88 may be reversed in their locations such that protrusion 28 is carried by bin 80 and recessed area 88 is carried by cart 20. The locations of protrusions 28 and recessed areas 88 may be varied about the periphery of their respective carrying members in order to suit the configuration of cart 20 and the needs of the field of application of the invention.

Additionally, it will be apparent that ramp 36 may be provided having one or more hinges at the location where the distal end of ramp 36 meets bottom wall 35. With such a configuration, ramp 36 may serve to replace partition 52.

The above detailed description of preferred and alternative embodiments, then, have been provided for exemplary purposes only and are not meant, nor should they be read, to limit the scope or spirit of the present invention; rather, the invention hereof is limited only by the appended claims.

What is claimed is:

1. A transport cart comprising:
   a cart portion comprising a first end having an end wall proximate thereto, an open second end, a first side wall, a second side wall, and a bottom wall, said walls in combination forming an open-second end and open-top cavity therebetween, said bottom wall of said cart portion disposed to act as a floor within said cavity when said cart portion is placed in a horizontal position;
   means carried by said first end of said cart portion for moving said transport cart;
   means carried by said second end of said cart portion for maneuvering said cart portion;
   a bin removably engagable within said cavity of said cart portion, said bin having an opening wherein said opening faces said second end of said cart portion; and,
   a partition engagable with said cart portion within said cavity and proximate said opening of said bin, said partition comprising an opening in communication with said opening of said bin, wherein said partition acts to assist in preventing the contents of said bin from escaping when said bin is engaged within said cavity of said cart portion, and wherein said partition acts to assist in preventing the contents of said cavity of said cart portion from escaping when said bin is not engaged within said cavity.

2. The transport cart of claim 1 wherein said partition opening is approximately centered in said partition.

3. The transport cart of claim 1 wherein said partition further comprises a debris intake port.

4. The transport cart of claim 3 wherein said debris intake port is adapted for use with a hose.

5. The transport cart of claim 3 wherein said partition further comprises a filter.

6. The transport cart of claim 3 wherein said partition further comprises a screen.

7. The transport cart of claim 3 wherein said partition further comprises an air exhaust port.

8. The transport cart of claim 1 wherein said bin is soft-sided.

9. A transport cart comprising:
   a cart portion comprising a first end having an end wall proximate thereto, an open second end, a first side wall, a second side wall, and a bottom wall, said walls in combination forming an open-second end and open-top cavity therebetween, said bottom wall of said cart portion disposed to act as a floor within said cavity when said cart portion is placed in a horizontal position;
   said end wall comprising an opening therein proximate said bottom wall;
   means carried by said first end of said cart portion for moving said transport cart;
   means carried by said second end of said cart portion for maneuvering said cart portion;
   a bin removably engagable within said cavity of said cart portion, said bin having an opening wherein said opening faces said second end of said cart portion; and,
   a partition engagable with said cart portion within said cavity and proximate said opening of said bin, wherein said partition acts to assist in preventing the contents of said bin from escaping when said bin is engaged within said cavity of said cart portion, and wherein said partition acts to assist in preventing the contents of said cavity of said cart portion from escaping when said bin is not engaged within said cavity.

10. The transport cart of claim 9 wherein said end wall further comprises a cover for overlying said end wall opening.

11. The transport cart of claim 10 wherein said cover may be selectively moved between an open and a closed position with respect to said end wall opening.

12. The transport cart of claim 11 wherein said cover may be selectively moved through a plurality of positions intermediate said open and closed positions.

13. The transport cart of claim 9 further comprising channeling means to direct a flow of material carried by said cart portion to said end wall opening.

14. The transport cart of claim 13 wherein said channeling means comprises a wall disposed intermediate a side wall and said bottom wall of said cart.

15. The transport cart of claim 13 wherein said channeling means is formed integrally with said cart portion.

16. The transport cart of claim 13 wherein said channeling means is removable from said cart portion.

17. A transport cart comprising:
   a cart portion comprising a first end having an end wall proximate thereto, an open second end, a first side wall, a second side wall, and a bottom wall, said walls in combination forming an open-second end and open-top cavity therebetween, said bottom wall of said cart portion disposed to act as a floor within said cavity when said cart portion is placed in a horizontal position;
   said end wall comprising an opening therein proximate said bottom wall;
   means carried by said first end of said cart portion for moving said transport cart;
   means carried by said second end of said cart portion for maneuvering said cart portion;

a bin removably engagable within said cavity of said cart portion, said bin having an opening wherein said opening faces said second end of said cart portion; and, a partition engagable with said cart portion within said cavity and proximate said opening of said bin, said partition comprising an opening in communication with said opening of said bin, wherein said partition acts to assist in preventing the contents of said bin from escaping when said bin is engaged within said cavity of said cart portion, and wherein said partition acts to assist in preventing the contents of said cavity of said cart portion from escaping when said bin is not engaged within said cavity.

18. The transport cart of claim 17 wherein said bin is soft-sided.

19. The transport cart of claim 17 wherein said end wall further comprises a cover for overlying said end wall opening.

20. The transport cart of claim 19 wherein said cover may be selectively moved between an open and a closed position with respect to said end wall opening.

* * * * *